United States Patent
Chu

(10) Patent No.: US 9,979,466 B2
(45) Date of Patent: May 22, 2018

(54) REVERSE WIRELESS BROADBAND SYSTEM

(71) Applicant: SPACE SYSTEMS/LORAL, LLC, Palo Alto, CA (US)

(72) Inventor: Peter Y. Chu, Palo Alto, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 155 days.

(21) Appl. No.: 14/820,408

(22) Filed: Aug. 6, 2015

(65) Prior Publication Data

US 2017/0041066 A1 Feb. 9, 2017

(51) Int. Cl.
*H04B 7/185* (2006.01)
*H04W 16/10* (2009.01)

(52) U.S. Cl.
CPC ..... *H04B 7/18584* (2013.01); *H04B 7/18502* (2013.01); *H04W 16/10* (2013.01)

(58) Field of Classification Search
CPC ........... H04B 7/18584; H04B 7/18502; H04W 16/10
See application file for complete search history.

(56) References Cited

U.S. PATENT DOCUMENTS

| | | | |
|---|---|---|---|
| 5,394,560 A | 2/1995 | Kane | |
| 5,412,660 A | 5/1995 | Chen | |
| 5,594,780 A | 1/1997 | Wiedeman | |
| 5,640,386 A | 6/1997 | Wiedeman | |
| 5,697,050 A | 12/1997 | Wiedman | |
| 5,809,141 A | 9/1998 | Dent | |
| 5,884,142 A | 3/1999 | Wiedman | |
| 5,898,681 A | 4/1999 | Dutta | |
| 5,963,862 A | 10/1999 | Adiwoso | |
| 6,240,124 B1 | 5/2001 | Wiedman | |
| 6,256,496 B1 | 7/2001 | Dintelmann | |
| 6,278,876 B1 | 8/2001 | Joshi | |
| 6,415,329 B1 | 7/2002 | Gelman | |
| 6,496,682 B2 | 12/2002 | Butte | |
| 6,704,543 B1 | 3/2004 | Sharon | |
| 8,379,613 B2 | 2/2013 | Foxworthy | |
| 8,923,756 B1* | 12/2014 | Freedman | H04B 7/2041 455/12.1 |
| 2003/0109220 A1 | 6/2003 | Hadinger | |
| 2003/0123481 A1* | 7/2003 | Neale | H04B 7/18582 370/466 |
| 2008/0051080 A1* | 2/2008 | Walker | H04B 7/2041 455/427 |

(Continued)

OTHER PUBLICATIONS

Berk, "A Frequency-Division Multiple-Access System Concept for 30/20 GHz High-Capacity Domestic Satellite Service," J. Spacecraft, vol. 20, No. 6, Nov.-Dec. 1983, pp. 619-625.

(Continued)

*Primary Examiner* — Ajay Cattungal
(74) *Attorney, Agent, or Firm* — Vierra Magen Marcus LLP

(57) ABSTRACT

A communication system uses resources (including a first signal path and a second signal path) in a first roundtrip direction for a first set of gateways and subscriber terminals while concurrently using the same resources (including the first signal path and the second signal path) in a second roundtrip direction for a second set of gateways and subscriber terminals.

23 Claims, 13 Drawing Sheets

(56) References Cited

U.S. PATENT DOCUMENTS

| | | | |
|---|---|---|---|
| 2010/0222068 A1* | 9/2010 | Gaal | H04W 56/0005 455/450 |
| 2011/0076991 A1* | 3/2011 | Mueck | H04L 1/0003 455/414.1 |
| 2015/0043464 A1* | 2/2015 | Lu | H04W 72/04 370/329 |
| 2016/0277990 A1* | 9/2016 | Chan | H04W 36/30 |
| 2017/0027017 A1* | 1/2017 | Black | H04B 7/18513 |

OTHER PUBLICATIONS

De Baere, "The Future of High Throughput Satellites for Service Providers," Nov. 27, 2013.

* cited by examiner

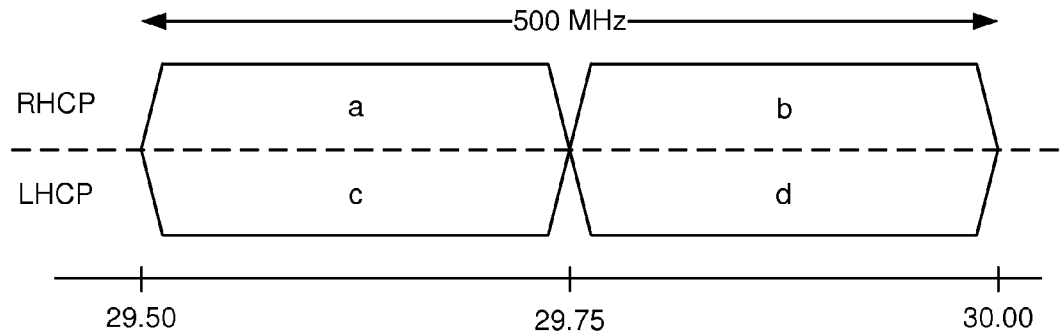
Figure 2A
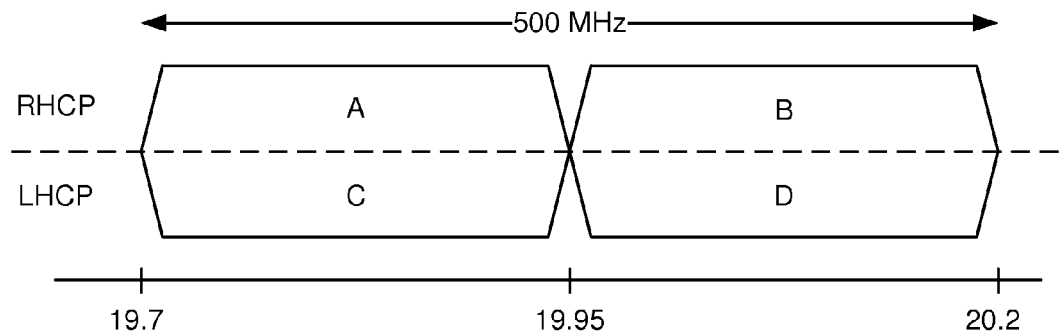
Figure 2B
|  | 19.7-19.95 GHz | 19.95-20.2 GHz | 29.5-29.75 GHz | 29.75-30.00 GHz |
|---|---|---|---|---|
| Forward Uplink |  |  | a,c | b,d |
| Forward Downlink | A,C | B,D |  |  |
| Return Uplink |  |  | a,c | b,d |
| Return Downlink | A,C | B,D |  |  |
Figure 2C

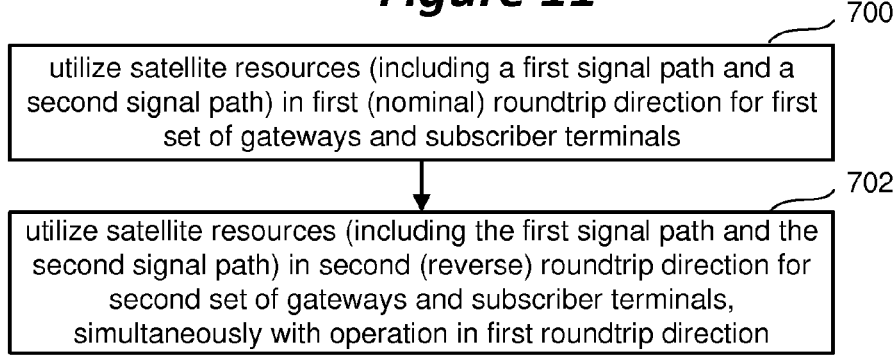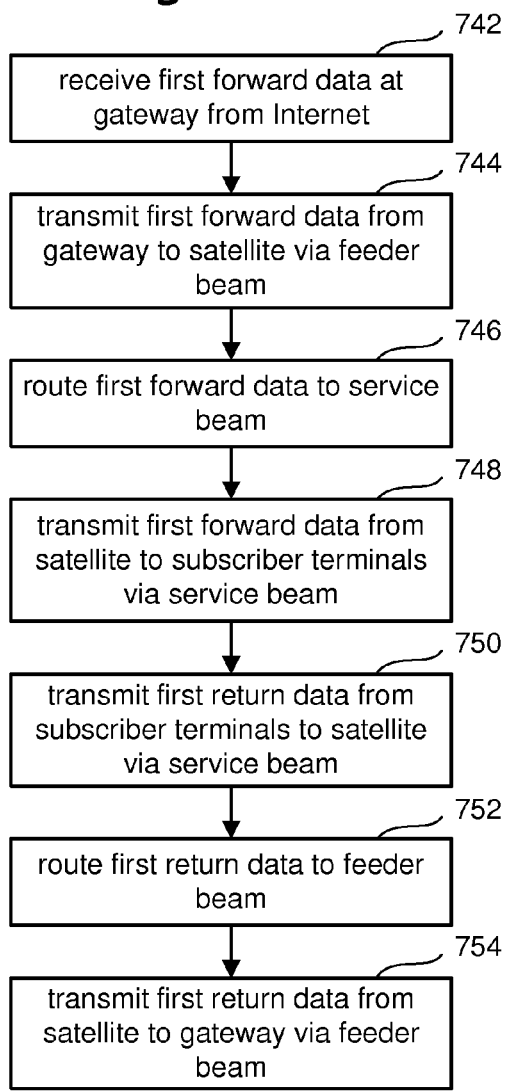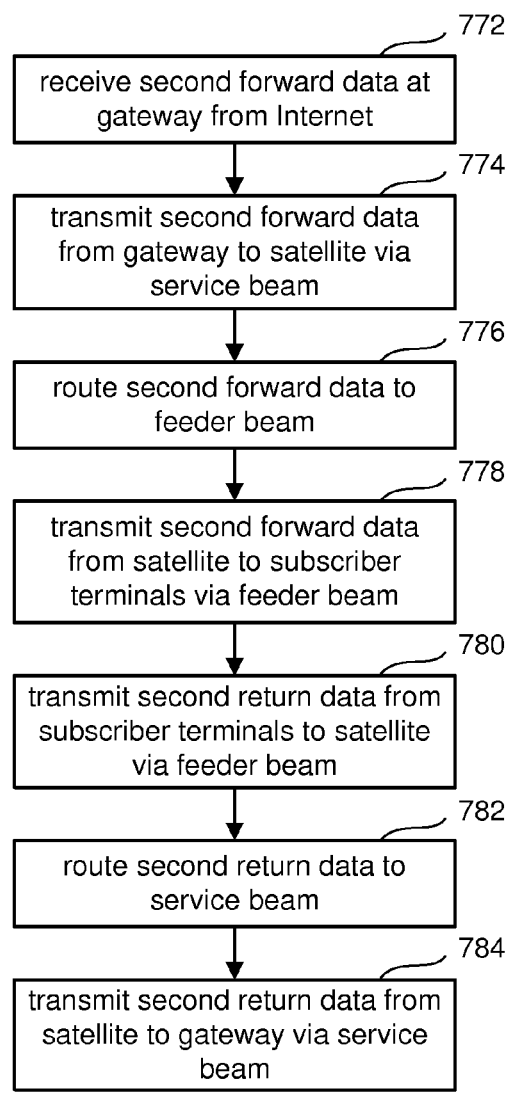

REVERSE WIRELESS BROADBAND SYSTEM

BACKGROUND

The present disclosure relates to technology for wireless communication systems.

Wireless communication systems typically include a communication platform such as a dedicated terrestrial antenna, airborne platform, or communications spacecraft such as a satellite. Such platforms typically operate within regulations that allocate at least one operating frequency bandwidth for a particular communications service and specify, among other things, a maximum signal power spectral density (PSD) of communications signals radiated to the ground, etc. A growing market exists for provision of high data rate communication services to individual consumers and small businesses which may be underserved by or unable to afford conventional terrestrial services. To advantageously provide high data rate communication services to such users, a communications platform must (1) provide a high PSD so as to enable the use of low cost subscriber terminals, and (2) efficiently use the licensed bandwidth so as to maximize the communications throughput for a particular licensed bandwidth.

Typically, frequency reuse plans are developed prior to design and deployment of a communication system in order to most efficiently service the projected needs of the system. In many cases, particularly in the case of space-based communications, these frequency reuse plans may be formed into the hardware of the device such that post deployment alterations are not feasible. Despite the best planning techniques, many communications platforms experience underutilized capacity in some areas while other areas do not have sufficient bandwidth to service the desired capacity.

BRIEF DESCRIPTION OF THE DRAWINGS

FIG. 2A depicts an example uplink frequency plan.

FIG. 2B depicts an example downlink frequency plan.

FIG. 2C is a diagram describing example frequency assignments for uplinks and downlinks using the frequency/polarization combinations of FIGS. 2A and 2B.

FIG. 11 is a flow chart describing one embodiment of a process for operating a satellite system.

FIG. 12 is a flow chart describing one embodiment of a process for using a first signal path and a second signal on a satellite system in a first round strip direction.

FIG. 13 is a flow chart describing one embodiment of a process for using a first signal path and a second signal on a satellite system in a second round strip direction.

DETAILED DESCRIPTION

To make use of underutilized capacity, a communication system operates a platform (e.g., terrestrial antenna, satellite, other airborne platform. etc.) in a nominal manner and a reverse manner. For example, satellite resources (including a first signal path and a second signal path) are utilized in a first roundtrip direction for a first set of gateways and subscriber terminals while concurrently using the same satellite resources (including the first signal path and the second signal path) in a second roundtrip direction for a second set of gateways and subscriber terminals.

In one embodiment, the first signal path and a second signal path are used in a first forward/return direction for a first set of gateways and subscriber terminals. When it is determined that there is available unused capacity on the first signal path and the second signal path for the first forward/return direction, a portion of a set of resources for the first signal path and the second signal path are provisioned for communication between a second set of gateways and subscriber terminals such that the first signal path and the second signal path are then also used in a second forward/return direction with the provisioned resources for the second set of gateways and subscriber terminals concurrently while utilizing the first signal path and the second signal path in the first forward/return direction for the first set of gateways and subscriber terminals. Later on it may be determined that the resources provisioned for the second forward/return direction are needed for the first forward/return direction; therefore, the system would shift that (or an equivalent or a different) set of resources so that they can be used with the first forward/return direction and stop utilizing the first signal path and the second signal path in the second forward/return direction with all or a subset of the second set of gateways and subscriber terminals.

Figure 1:
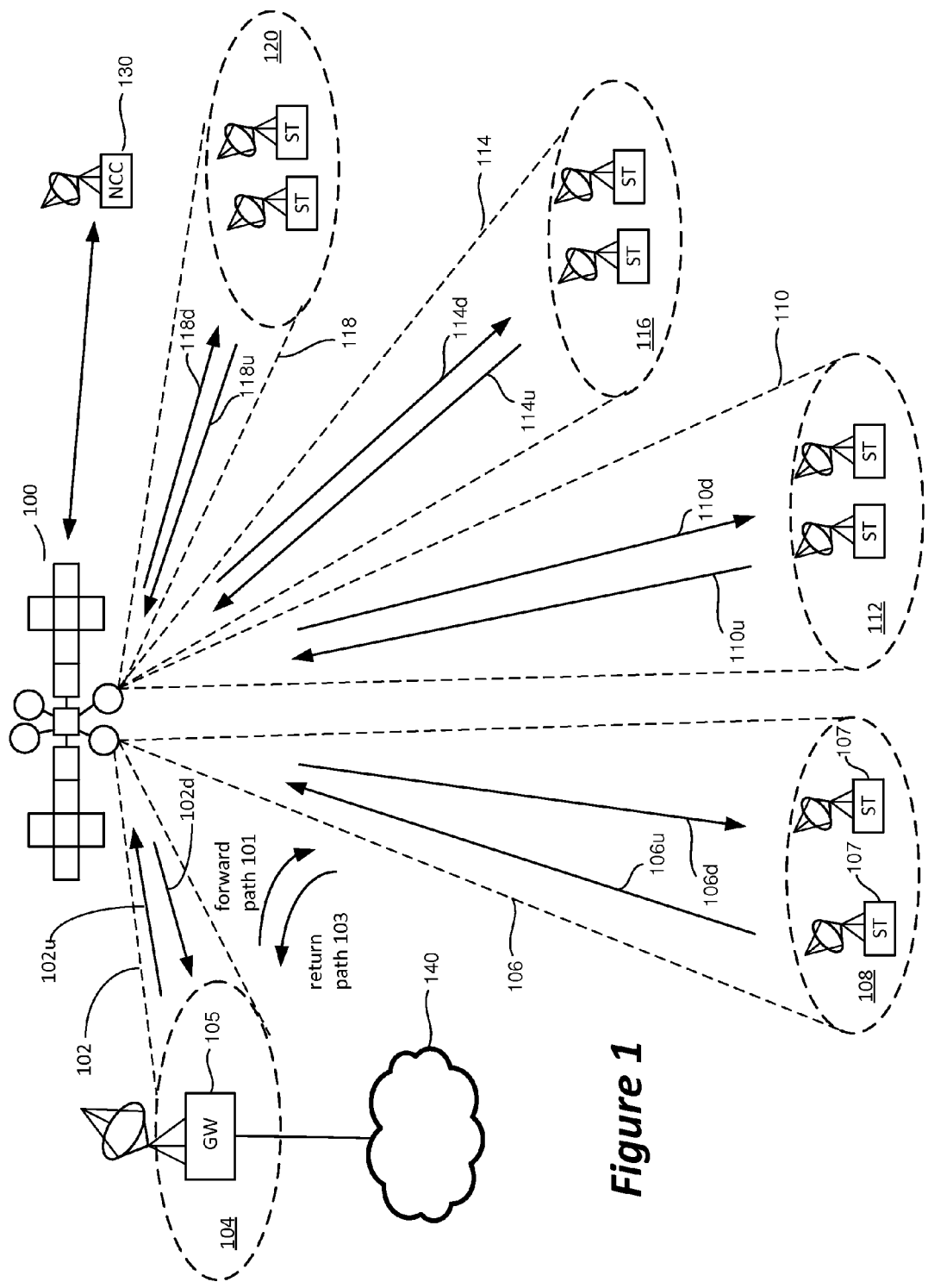
FIG. 1 is a block diagram describing a wireless communications system.

FIG. 1 depicts a block diagram of a wireless communications system that includes a communication platform 100, which may be a satellite located, for example, at a geostationary or non-geostationary orbital location. In other embodiments, other platforms may be used such as UAV or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway 105 and a plurality of subscriber terminals ST (including subscriber terminals 107). The term subscriber terminals may be used to refer to a single subscriber terminal or multiple subscriber terminals.

A subscriber terminal is adapted for communication with the wireless communication platform including as satellite 120. Subscriber terminals may include fixed and mobile subscriber terminals including, but not limited to, a cellular telephone, wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile.

The at least one gateway 105 may be coupled to a network 140 such as, for example, the Internet, terrestrial public switched telephone network, mobile telephone network, or a private server network, etc. A gateway 105 and the satellite (or platform) 100 communicate over a feeder beam 102, which has both a feeder uplink 102u and a feeder downlink 102d. In one embodiment, feeder beam 102 is a spot beam that may operate in an assigned or allocated set of one or more frequency bands (e.g., between 17 and 80 GHz) to illuminate a region 104 on the Earth's surface (or another surface). Gateway 105 is located in region 104 and communicates with satellite 100 via feeder beam 102. Although a single gateway is shown, typical implementations will include many gateways, such as five, ten, or more. Each gateway may utilize its own feeder beam, although more than one gateway can be positioned within a feeder beam. Note that the terms "feeder" beams and "service" beams are used for convenience and are with respect to the nominal direction. Both feeder beams and service beams are spot beams and the terms are not used in a manner to limit the function of any beam.

Subscriber terminals ST and satellite 100 communicate over service beams; for example, FIG. 1 shows service beams 106, 110, 114 and 118 for illuminating regions 108, 112, 116 and 120, respectively. In many embodiments, the communication system will include more than three service beams (e.g., 60, 100, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. Although the above example mentions service beam 106, the example could have used other service beams.

The nominal roundtrip direction also includes data being sent from the subscriber terminals ST over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. Although the above example uses service beam 106, the example could have used any service beam.

FIG. 1 also shows a Network Control Center 130, which includes an antenna system and modem for communicating with satellite 100, as well as one or more processors and data storage units. Network Control Center 130 provides commands to control and operate satellite 100. Network Control Center 130 may also provide commands to any of the gateways and/or subscriber terminals.

The architecture of FIG. 1 is provided by way of example and not limitation. Embodiments of the disclosed technology may be practiced using numerous alternative implementations.

FIG. 2A shows a frequency band allocation in a communications system for a set of uplink signals. FIG. 2B shows a corresponding frequency band allocation in the communications system for a set of downlink signals. A specific example is described for a four color re-use plan. Each color represents a unique combination of frequency band and antenna polarization. In this example, color 'a' represents a first sub-band (29.50 GHz-29.75 GHz) of an allocated uplink frequency band (29.50 GHz-30.00 GHz) with a right-hand circular polarization (RHCP). Color 'b' represents a second sub-band (29.75 GHz-30.00 GHz) of the allocated uplink frequency band with RHCP. Color 'c' represents the first sub-band of the allocated uplink frequency band with a left-hand circular polarization (LHCP). Color 'd' represents the second sub-band of the allocated uplink frequency band with LHCP.

Similarly for the downlink, color 'A' represents a first sub-band (19.70 GHz-19.95 GHz) of the allocated downlink frequency band (19.70 GHz-20.20 GHz) with RHCP. Color 'B' represents a second sub-band (19.95 GHz-20.20 GHz) of the allocated downlink frequency band with RHCP. Color 'C' represents the first sub-band of the allocated downlink frequency band with LHCP. Color 'D' represents the second sub-band of the allocated downlink frequency band with LHCP. In other embodiments, the colors may include other allocations of the frequency band and polarization.

FIG. 2C is a table showing an example of an allocation of the unique frequency/polarization combinations (colors) to the uplink and downlink signals for feeder beam 102 and the service beams (e.g. 106, 110, 114, 118). The forward uplink (e.g., 102u) and return uplinks (e.g., 106u, 110u, 114u, 118u) share the 29.50 GHz-30.00 GHz spectrum such that colors a-d can be re-used. Colors 'a' and 'c' in the 29.50 GHz to 29.75 GHz band are colors assigned to spot beams for both forward uplinks and return uplinks. Colors 'b' and 'd' in the 29.75 GHz to 30.00 GHz band are colors assigned to spot beams for both forward uplinks and return uplinks. In one example, the forward uplinks are used for gateway to satellite communication. If the gateways are geographically isolated from each other and the subscriber terminals, all of the colors 'a'-'d' may be re-used by all of the gateways. If a feeder beam is adjacent to another feeder beam or is adjacent to a service beam, the assignments may be made in such a way that the feeder beam does not use the same color for any beam to which it is adjacent. The return uplinks are used for subscriber terminal to satellite communication in one example. Each service beam may be assigned one or more dedicated colors 'a'-'d.' The assignments may be made such that adjacent service beams do not share the same color.

Similarly, the forward downlinks (e.g., 106d, 110d, 114d, 114d) and return downlinks (e.g., 102d) share the 19.70 GHz-20.20 GHz spectrum such that colors A-D can be re-used between the forward and return downlinks. Colors 'A' and 'C' in the 19.70 GHz to 19.925 GHz band are colors assigned to spot beams for both forward downlinks (e.g., subscriber terminals) and return downlinks (e.g., gateways) as well as colors 'B' and 'C' in the 19.975 GHz to 20.20 GHz band. The return downlinks are used for satellite to gateway communication in one example. If the gateways are geographically isolated all of the colors 'A'-'D' may be re-used by all of the gateways. If a feeder beam is adjacent to another feeder beam or is adjacent to a service beam, the assignments may be made in such a way that the feeder beam does not use the same color for any beam to which it is adjacent. The forward downlinks are used for satellite to subscriber terminal communication in one example. Each user spot beam may be assigned one or more dedicated colors 'A'-'D.' The assignments may be made such that adjacent service beams do not share the same color.

Figure 3A:
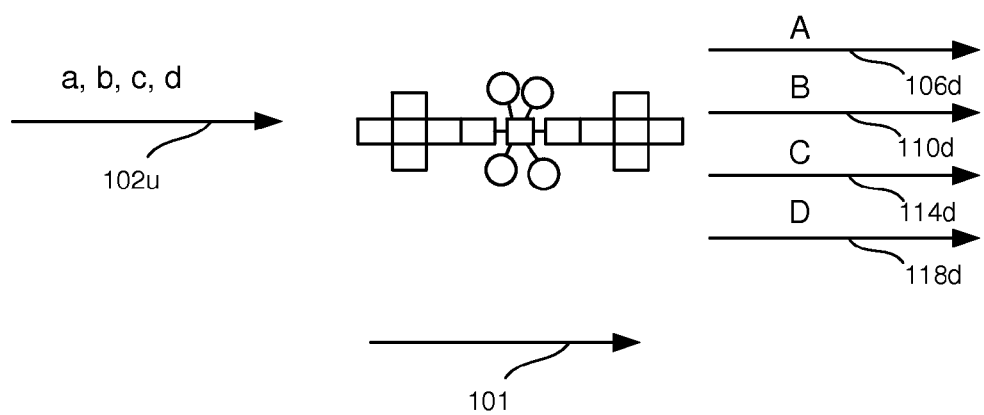
FIG. 3A depicts example assignments of frequency/polarization combinations for one embodiment of a forward path using a satellite.

FIG. 3A shows more details of forward path 101, with respect to the allocation of frequency bands/channels, as discussed above. For the forward uplink (e.g., 102u), data is transmitted using colors a, b, c and d; routed by satellite 100 to the appropriate set of service beams and then transmitted to the subscriber terminals via the serviced beams. In one example, each service beam only transmits in one color; therefore, one feeder beam transmitting in four colors is paired with four service beams. In the example of FIG. 3A, data transmitted in feeder beam uplink 102u in frequency channel a is routed to service beam 106 for transmission on downlink 106u in frequency channel A; data transmitted in feeder beam uplink 102u in frequency channel b is routed to service beam 110 for transmission on downlink 110u in frequency channel B; data transmitted in feeder beam uplink 102u in frequency channel c is routed to service beam 114 for transmission on downlink 114u in frequency channel C; and data transmitted in feeder beam uplink 102u in frequency channel d is routed to service beam 118 for transmission on downlink 118u in frequency channel D.

Figure 3B:
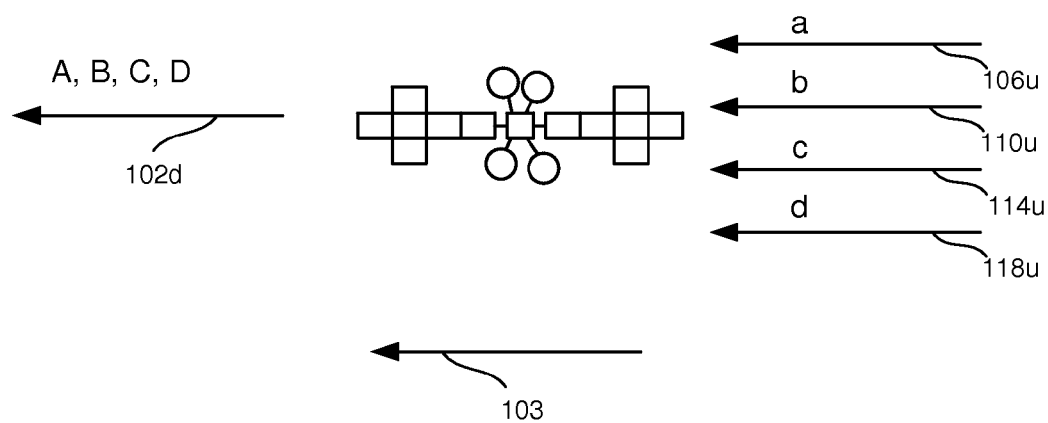
FIG. 3B depicts example assignments of frequency/polarization combinations for one embodiment of a return path using a satellite.

FIG. 3B shows more details of return path 103, with respect to the allocation of frequency bands/channels, as discussed above. Data is transmitted by the subscriber terminals in the uplinks of the service beams using colors a, b, c and d; routed by satellite 100 to feeder beam 102 and transmitted to gateway 100. In this example, each service beams only transmits in one color. In other embodiments, service beams can transmit in more than one color. In the example of FIG. 3B, data is transmitted to satellite 100 in service beam uplink 106u using color a and then transmitted to gateway 105 via downlink 102d using color A; data is transmitted to satellite 100 in service beam uplink 110u using color b and then transmitted to gateway 105 via downlink 102d using color B; data is transmitted to satellite 100 in service beam uplink 1114u using color c and then transmitted to gateway 105 via downlink 102d using color C; data is transmitted to satellite 100 in service beam uplink 118u using color d and then transmitted to gateway 105 via downlink 102d using color D.

Figure 4:
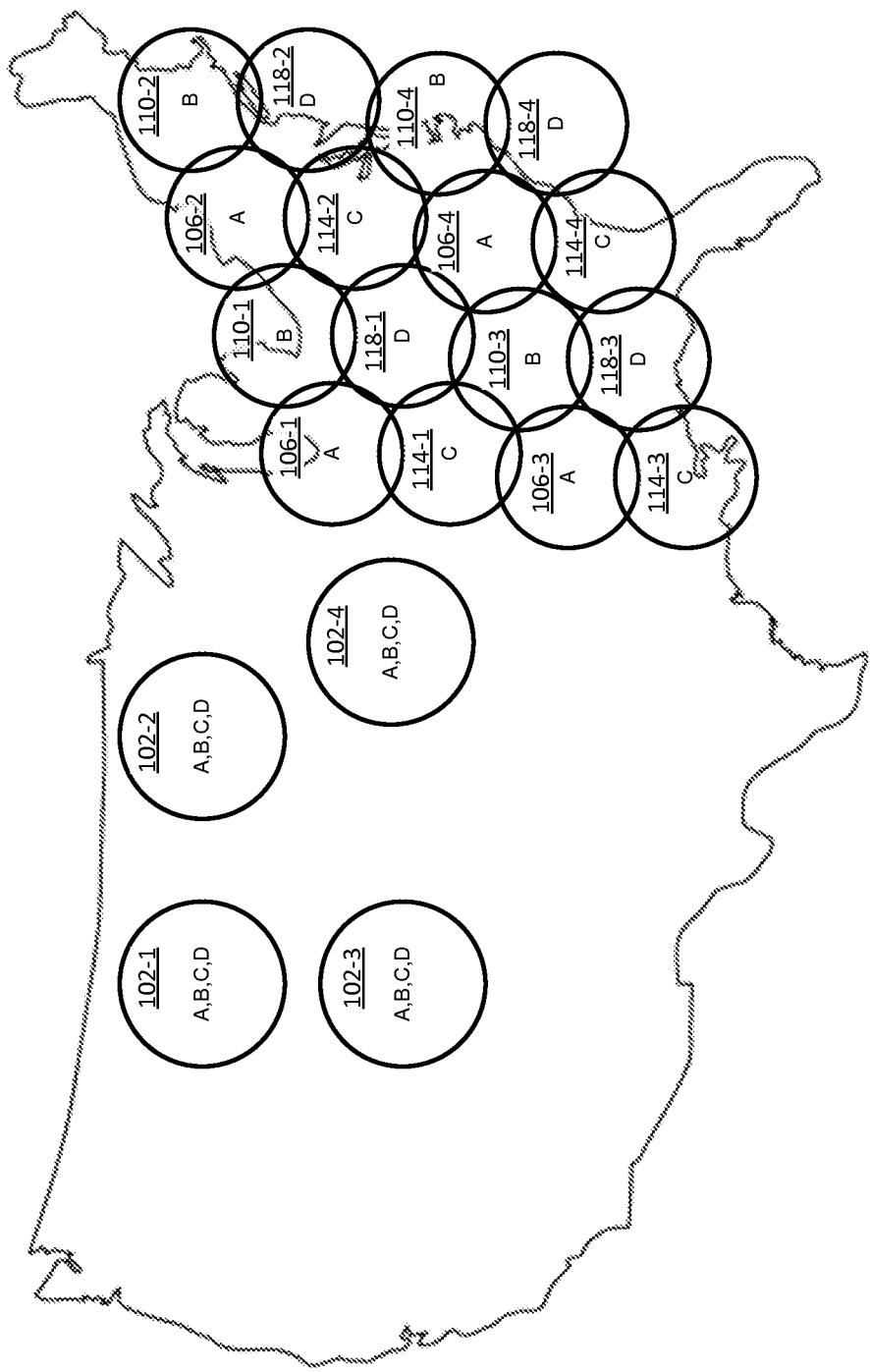
FIG. 4 is one embodiment of a beam map.

FIG. 4 shows a beam pattern created by the antenna system of satellite 100 for an example layout of spot beams using the colors of FIGS. 2A, 2B, 2C, 3A and 3B. Spot beams 102-1, 102-2, 102-3 and 102-4 are feeder beams that illuminate a region occupied by a gateway. Spot beams 106-1, 106-2, 106-3, 106-4, 110-1, 110-2, 110-3, 110-4, 114-1, 114-2, 114-3, 114-4, 118-1, 118-2, 118-3 and 118-4 are service beams that illuminate regions occupied by many subscriber terminals.

Typically, an assignment of colors to service beams provides that two adjacent service beams do not share a common color for use at a given time. In the disclosed example, adjacent beams do not share the same color such that the unique combinations of frequency and polarization are not shared between adjacent beams. In FIG. 4, an example is shown where each feeder beam is spatially separated from each of the service beams as well as the other feeder beams. Accordingly, each gateway may operate in its feeder beam at every color without interfering with communication in the other service beams and feeder beam. The individual service beams operate at one of the four available colors such that no two adjacent service beams share the same color. In this manner, frequency reuse between service beams does not lead to interference where the coverage areas at least partially overlap.

It is noted that in FIG. 4 only the uppercase lettering designating the downlink signals in the feeder and service beams is depicted for simplicity purposes. Similarly, each beam operates at the frequency/polarization combination for uplink signals at the color identified by the corresponding lowercase letter. Moreover, a four color re-use plan is provided as an example only, as any number of colors may be used in a given frequency re-use plan.

Figure 5:
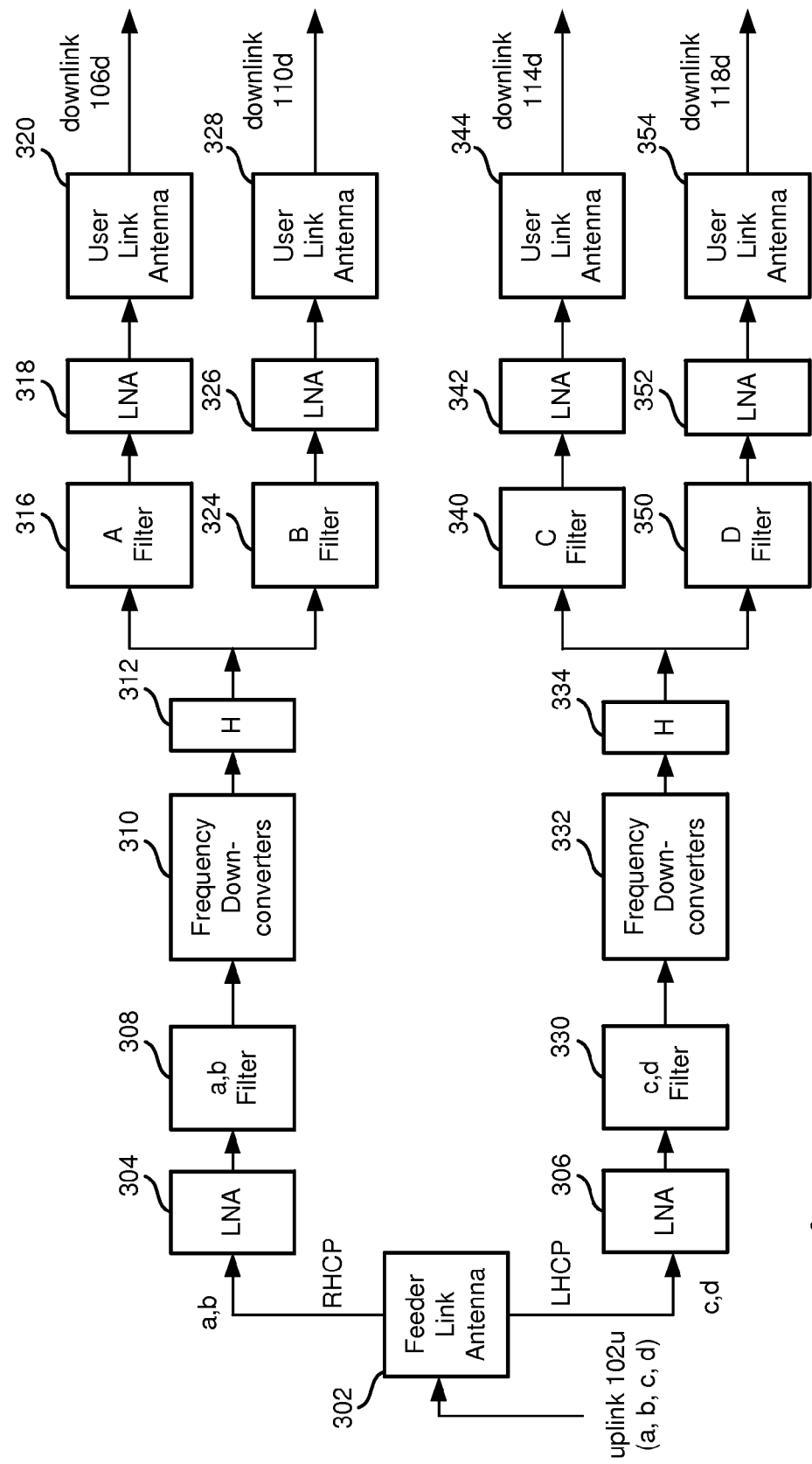
FIG. 5 is a simplified block diagram of example components in a satellite system that can implement one embodiment of a forward path.
Figure 6:
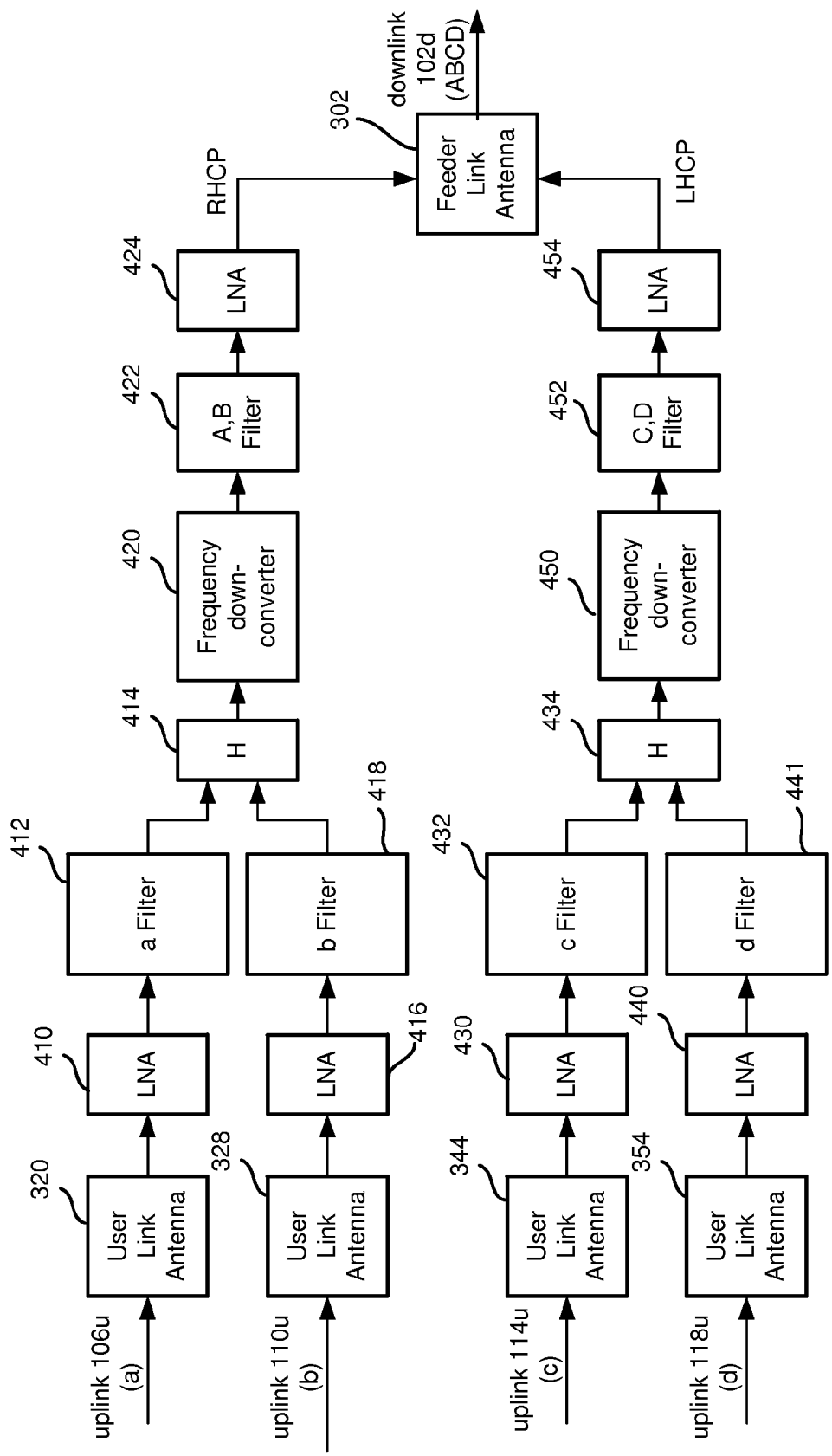
FIG. 6 is a block diagram of example components in a satellite system that can implement one embodiment of a return path.

FIG. 5 is a block diagram describing one embodiment of the components of a first signal path for satellite (or platform) 100. FIG. 6 is a block diagram describing one embodiment of the components of a second signal path for satellite 100. Together, the first signal path of FIG. 5 and the second signal path of FIG. 6 allow communication between gateway 105 of feeder beams 102 and the subscriber terminals of service beams 106/110/114/118. It is contemplated that in a larger satellite system, which includes multiple gateways, the circuits of FIGS. 5 and 6 (or circuits similar thereto) will be replicated many times for multiple pairs of gateways and subscriber terminals.

Looking at FIG. 5, the uplink 102u from gateway 105 (using colors a, b, c, d) are received at a feeder link antenna 302 of satellite 100. As described above with respect to FIGS. 2A, 2B and 2C, a and b are received using right hand circular polarization (RHCP) and c and d are received using left hand circular polarization (LDCP). The signals using colors a and b are provided to low noise amplifier (LNA) 304, while the signals using colors c and d are provided to LNA 306. LNA 304 is used to amplify the signals received in colors a and b. The output of LNA 304 is provided to filter 308. In one embodiment, filter 308 is a band pass filter that allows signals to pass within the frequency bands of colors a and b. The output of filter 308 is provided to frequency down converters 310. Looking back at FIGS. 2A and 2B, the uplink signals of FIG. 2A are at higher frequencies than the downlink signals of FIG. 2B; therefore, uplink signals have to be frequency down converted prior to being transmitted down to the ground. Therefore, the first signal path will include frequency down converters. If the uplink signals are at lower frequencies than the downlink frequencies, then the path would include up converters. Either way, a frequency converter is used. The output frequency of down converter 310 is provided to hybrid 312, which splits the signal into two identical copies: one copy of the signal being transmitted to band pass filter 316 and another copy of the signal being transmitted to band pass filter 324. Band pass filter 316 allows signals to pass within the frequency range of color A. The output of filter 316 is provided to LNA 318. The output of low noise amplifier 318 is provided to the user link antenna 320, which sends a signal on downlink 106d to subscriber terminals ST. Filter 324 allows signals within the frequency band of color b to pass. The output of filter 324 is provided to LNA 326. The output of LNA 326 is provided to user link antenna 328 which sends a signal to subscriber terminals ST via downlink 110d.

The output of low noise amplifier 306 is provided to band pass filter 330, which allows signals within the frequency bands of colors c and d to pass. The output of filter 330 is provided to frequency down converter 332. The output of frequency down converter 332 is provided to hybrid 334, which as a splitter. One copy of the input to hybrid 334 is provided to filter 340 and the other copy is provided to filter 350. Filter 340 is a band pass filter that lets frequencies of color C to pass. The output of filter 340 is provided to LNA 342. The output of LNA 342 is provided to user link antenna 344. Filter 350 allows frequencies to pass that are within the frequencies associated with color D. The output of filter 350 is provided LNA 352. The output of LNA 352 is provided to user link antenna 354, which transmits the output signal to downlink 118d. User link antenna 344 transmits its signal on downlink 114d. FIG. 5 shows feeder link antenna 302, user link antenna 320, user link antenna 328, user link antenna 344 and user link antenna 354 as separate components. However, in some embodiments, all the antennas are part of one antenna system which can include one or multiple antennas so that some or all of the antennas depicted in FIG. 5 can be combined into a single antenna.

FIG. 6 is a block diagram describing one embodiment of the components of a second signal path on satellite (or platform) 100. The components of FIG. 5 receive data from gateway 105 and provide that data to subscriber terminals ST. On the other hand, the components of FIG. 6 receive data from the subscriber terminals ST and provide that data to gateway 105. Therefore, for one example traditional system, the components of FIG. 5 provide the forward path 101 (see FIG. 1) while the components of FIG. 6 provide the return path 103 (see FIG. 1).

User link antenna 320 (of FIG. 6) receives uplink 106u, which provides data using the frequencies of color a. The signal received at user link antenna 320 is provided to LNA 410. The output of LNA 410 is provided to filter 412, which is a band pass filter that allows frequencies to pass within color a. The output of filter 412 is provided to hybrid 414, which is functioning as a directional coupler that combines two signals into one. User link antenna 428 receives uplink 110u, which provides signals using color b. That signal is provided to LNA 416 which amplifies the signal and sends it to filter 418. In one embodiment, filter 418 is a band pass filter that allows frequencies to pass within the frequency range of color b. The output of filter 418 is provided to hybrid 414, which combines the signals from filters 412 and 418 into one combined signal and provides that combined signal to frequency down converter 420. The output of frequency down converter 420 is provided to filter 422. In one embodiment, filter 422 is a band pass filter that allows frequencies to pass within the bands associated with colors A and B. The output of filter 422 is provided to LNA 424. The output of LNA 424 is the right hand circular polarization signal to be output by feeder link 302 via downlink 102d using colors A and B.

User link antenna 344 receives uplink 114u, which sends data using color c. That signal is provided to LNA 430. The output of LNA 430 is provided to filter 432, which is a band pass filter allowing signals to pass within the frequency range associated with color c. The output of filter 432 is provided to hybrid 434. User link antenna 354 receives uplink 118u which includes data being transmitted in color d. That signal is provided to LNA 440 which amplifies the signal and sends it to filter 441. In one embodiment, filter 441 is a band pass filter that allows signals within the frequency band of color d to pass. The output of filter 441 is provided to hybrid 434. In one embodiment, hybrid 434 is operating as a directional coupler which combines the signals received from filter 432 and filter 441 and provides a combined signal to frequency down converter 450. The output of frequency down converter 450 is provided to band pass filter 452, which allows signals to pass within the frequency ranges of colors C and D. The output of filter 452 is provided to LNA 454. The output of LNA 454 is sent to feeder link antenna 302 as the left hand circular polarized signal for downlink 102d which includes colors C and D. FIG. 6 shows feeder link antenna 302, user link antenna 320, user link antenna 328, user link antenna 344 and user link antenna 354 as separate components. However, in some embodiments, all the antennas are part of one antenna system which can include one or multiple antennas so that some or all of the antennas depicted in FIG. 6 can be combined into a single antenna.

Figure 7A:
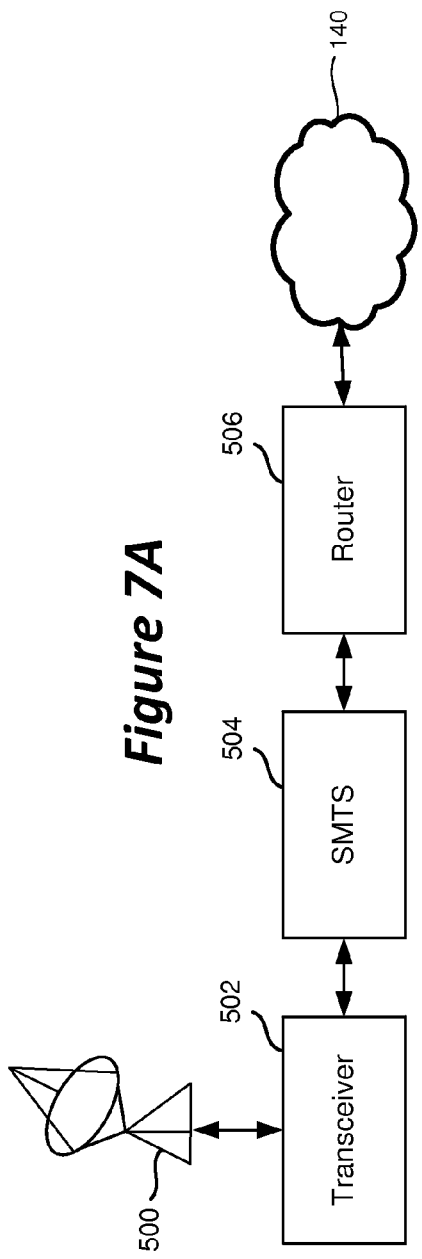
FIG. 7A is a block diagram of one embodiment of a gateway.

FIG. 7A is a block diagram describing one embodiment of gateway 105. As can be seen, gateway 105 includes an antenna system 500 connected to transceiver 502. Together, antenna 500 and transceiver 502 are used to send signals to satellite (or platform) 100 and receive signals from satellite (or platform) 100. Transceiver 502 is in communication with satellite modem termination system (SMTS) 504, which controls communication between the gateway and the satellite. For example, SMTS 504 will perform adaptive coding and modulation, IP multi-cast support, security, a network interface, DOCSIC, DVB-RCS and other modem-like functions. Connected to SMTS 504 is a router for routing data to and from network 140. In one embodiment, SMTS 504 will perform the functions of router 506.

Figure 7B:
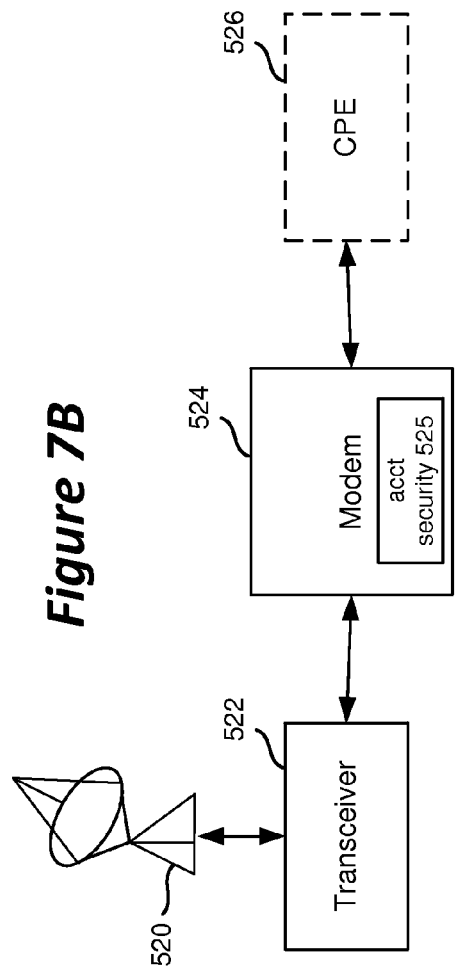
FIG. 7B is a block diagram of one embodiment of a subscriber terminal.

FIG. 7B is a block diagram depicting an example of components used to implement a subscriber terminal (ST). Antenna system 520 and transceiver 522 (connected together) are used to perform communication to and from satellite (or platform) 100. Transceiver 522m which is connected to modem 524, performs IP multi-cast support, adaptive coding and modulation, network interface and other satellite communication functions. Modem 524 also includes software 525 to perform accounting and security features, and possibly hardware for cache and other known features in the art. Modem 524 is in communication with the customer premises equipment (CPE) 526, which may include a user's computer, wireless router, network, smart appliance, etc.

Typically, frequency reuse plans and beam maps are developed prior to deployment of a communication satellite (or other platform) in order to most sufficiently service the projected needs of the customer base. Despite the best plan and techniques, sometimes some of the beams experience underutilized capacity. For example, the system operator may notice that a beam is not full, meaning that there is available unused capacity for a spot beam. For example, looking back at FIG. 1 it may be found during deployment of satellite 100 that although service beam 106 can service X subscriber terminals, there are fewer than X subscriber terminals using the system (or the X terminals happen to need less resources than planned at the moment or in a period.). Therefore there is unused and available capacity within service beam 106, in either forward or return or both paths. Since there is unused and available capacity in service beam 106, often there is also corresponding unused capacity in feeder beam 102. Therefore, the first signal path and second signal path that are used to route communication between feeder beam 102 and service beam 106 also has available unused capacity.

Figure 8:
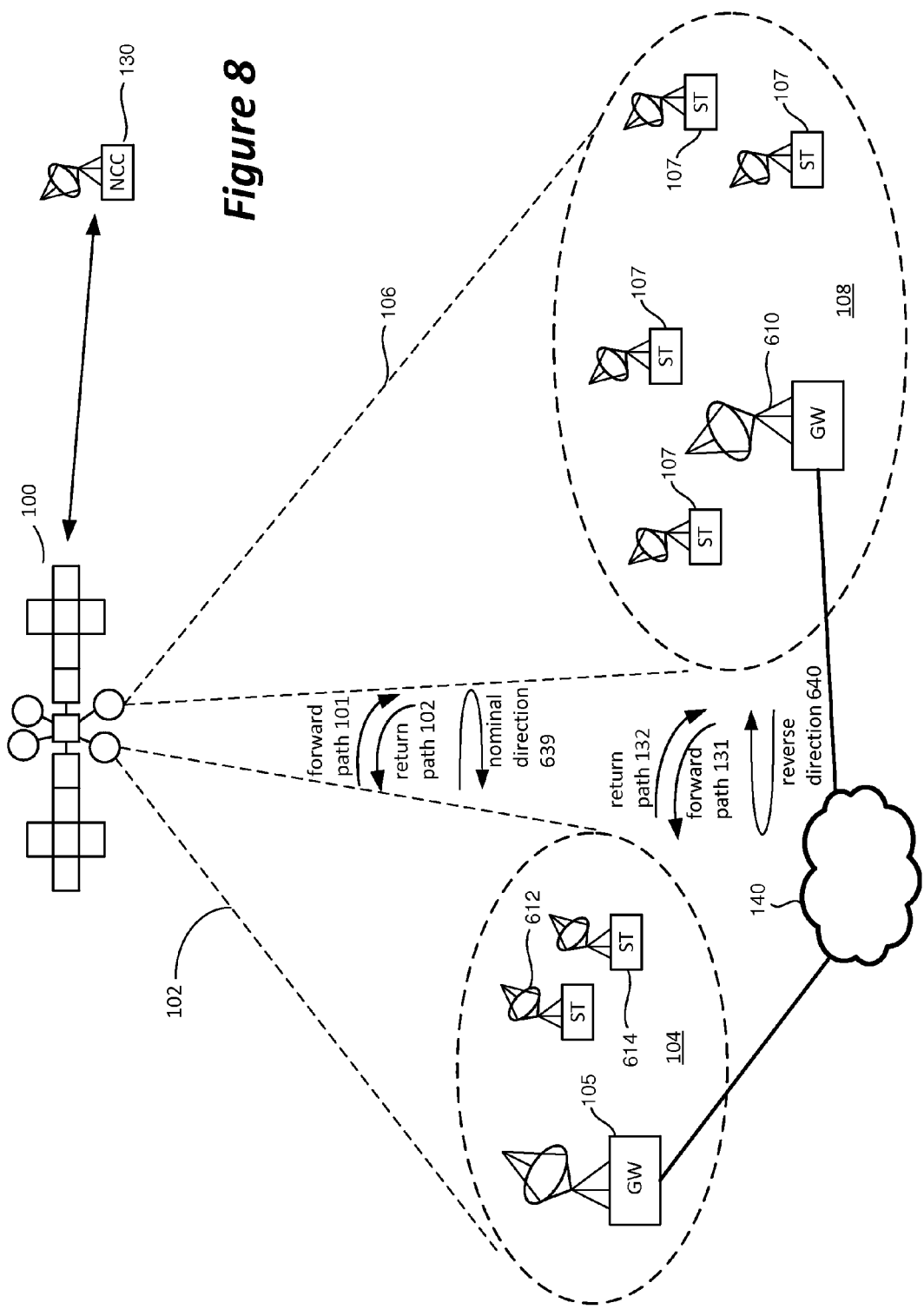
FIG. 8 is a block diagram describing a wireless communications system implementing one embodiment of the disclosed technology.

It is proposed herein to take advantage of this available or un-used capacity is to add one or more gateways in service beam 106 and one or more subscriber terminals in feeder beam 102, and use the satellite system in reverse so that the system can take advantage of subscriber terminals in region 104 that want to use the communication system associated with satellite (or platform) 100. This technology is illustrated in FIG. 8 which shows satellite (or platform) 100, feeder beam 102 and service beam 106 (beams 110, 114 and 118 were left out of the drawing to simply the explanation, but would still be operating). As can be seen, a set of one or more subscriber terminals 612 and 614 are added to region 104 being illuminated by feeder beam 102. Similarly, a gateway 610 is added to regional 108 that is illuminated by service beam 106.

In some embodiments, satellite 100 and the nominal service beam 102 is designed with larger antenna in mind at the gateways. To allow a subscriber terminal with a smaller antenna to work with service beam 102, various known remedies can be used such as a somewhat larger antenna, a more powerful amplifier for transmit, a lower noise LNA for receive, lower loss cables, more robust error-correction code, different modulation method with more Hz per bit/sec, etc. At the other end, satellite 100 and the nominal service beam 106 can be designed with smaller antenna in mind in the subscriber terminals. Gateway 610, if using a standard larger antenna designed for gateways, may have excess link margins and therefore its antenna size may be reduced. Gateway 620, as converted from a subscriber terminal, may not need any modification in its antenna and RF circuits.

Note that in some embodiments, satellite 100 does not need any hardware modification or tuning when the technology disclosed herein is used to tap the unused capacity. Other embodiments may advantageously adjust the satellite design, for example a larger onboard antenna for feeder beam 102 to reduce cost of subscriber terminals 612/614.

The system will be used to allow communication between subscriber terminals 612 and 614 and gateway 610 by operating satellite 100 in reverse. For gateway 105 communicating with subscriber terminals 107, forward path 101 and return path 102 are depicted in FIG. 8. Together, forward path 101 and return path 102 represent a nominal round trip direction 639. For gateway 610 communicating with subscriber terminals 612 and 614, forward path 131 and return path 132 are depicted in FIG. 8 and together represent reverse roundtrip direction 640. As such, forward path 131 is the reverse forward path and return path 132 is the reverse return path. Thus, the system will operate in nominal roundtrip direction 639 concurrently with reverse roundtrip direction 640 so that subscriber terminals 612 and 614 can concurrently access the Internet (network 140) at the same time as subscriber terminals 107 accessing the Internet. In one embodiment, the reverse roundtrip direction 640 is an opposite direction than nominal roundtrip direction 639. Note that gateway 610 and terminal 107 share the resources provided by beam 106 (indicated by its color), while terminals 612/614 and gateway 105 share the resources provided by beam 102.

In the embodiment of FIG. 8, beam 102 is no longer acting exclusively like a feeder beam. Similarly, beam 106 is no longer acting exclusively like a service beam. Therefore, it may be more useful to drop the tags "feeder" and "service" and just call them beams. In such an embodiment, satellite 100 is configured to create a beam pattern that includes a first beam 102 illuminating a first region 104 and a second beam 106 illuminating a second region 108. Satellite resources are utilized in a first round trip direction 639 (nominal roundtrip direction) including receiving first forward data from the first gateway 105 via the first beam 102 and transmitting that first forward data to the first set of subscriber terminals 107 via the second beam 106, as well as receiving a first return data from the first set of subscriber terminals 107 via the second beam 106 and transmitting that first return data to the first gateway 105 via the first beam 102. The satellite resources are also utilized in a second roundtrip direction 640 (reverse roundtrip direction) including receiving second forward data from the second gateway 610 via the second beam 106 and transmitting that second forward data to the second set of subscriber terminals 612 via the first beam 102, as well as receiving second return data from the second set of subscriber terminals 612 and 614 via first beam 102 and transmitting that second return data to the second gateway via the second beam 106.

The functions of operating in the nominal roundtrip direction 639 and reverse roundtrip direction 640 are both performed concurrently on the first signal path of FIG. 5 and the second signal path of FIG. 6. This can be accomplished by allocating a portion of the resources of the first signal path and second signal path to the reverse roundtrip direction 640 while a portion of the resources remain with the nominal roundtrip direction 639. For example, in one embodiment, the system uses time division multiplexing (TDMA) that includes breaking up communication in any given color into a series of time slots. Some of the time slots can be used for the nominal roundtrip direction 639 while some of the time slots can be used for reverse roundtrip direction 640. In one embodiment, time slots used for the nominal roundtrip direction 639 are interleaved with the time slots used for reverse roundtrip direction 640. Allocation of resources can be under the control of or at the command of network control center 130, which is also depicted in FIG. 8. In another embodiment, the system uses Frequency-division multiplexing (FDM), which is a scheme in which numerous signals are combined for transmission on a single communications line or channel. Each signal is assigned a different frequency subchannel within the main channel. Some of the subchannels can be used for the nominal roundtrip direction 639 while some of the subchannels can be used for reverse roundtrip direction 640.

Figure 9:
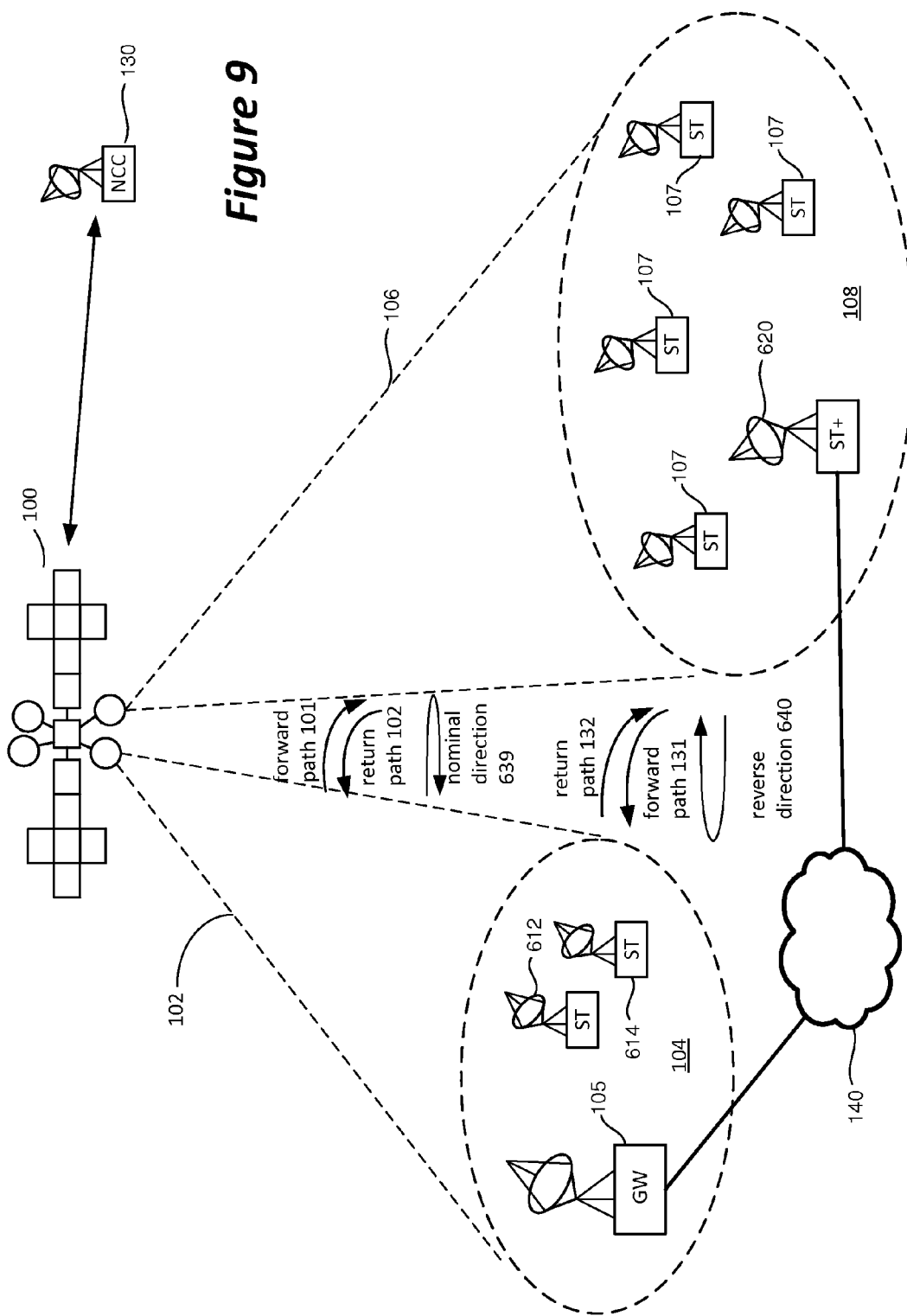
FIG. 9 is a block diagram describing a wireless communications system implementing one embodiment of the disclosed technology.

FIG. 9 shows an alternate embodiment to FIG. 8. The difference between FIG. 8 and FIG. 9 is that rather than adding a full gateway 610 into service beam 106, the embodiment of FIG. 9 converts a subscriber terminal into a network connected subscriber terminal 620. One may call this a super subscriber terminal (ST+). The super subscriber terminal (ST+) connects directly (not through satellite 100) to network 140 and provides gateway services to subscriber terminals 612 and 614.

Figure 10:
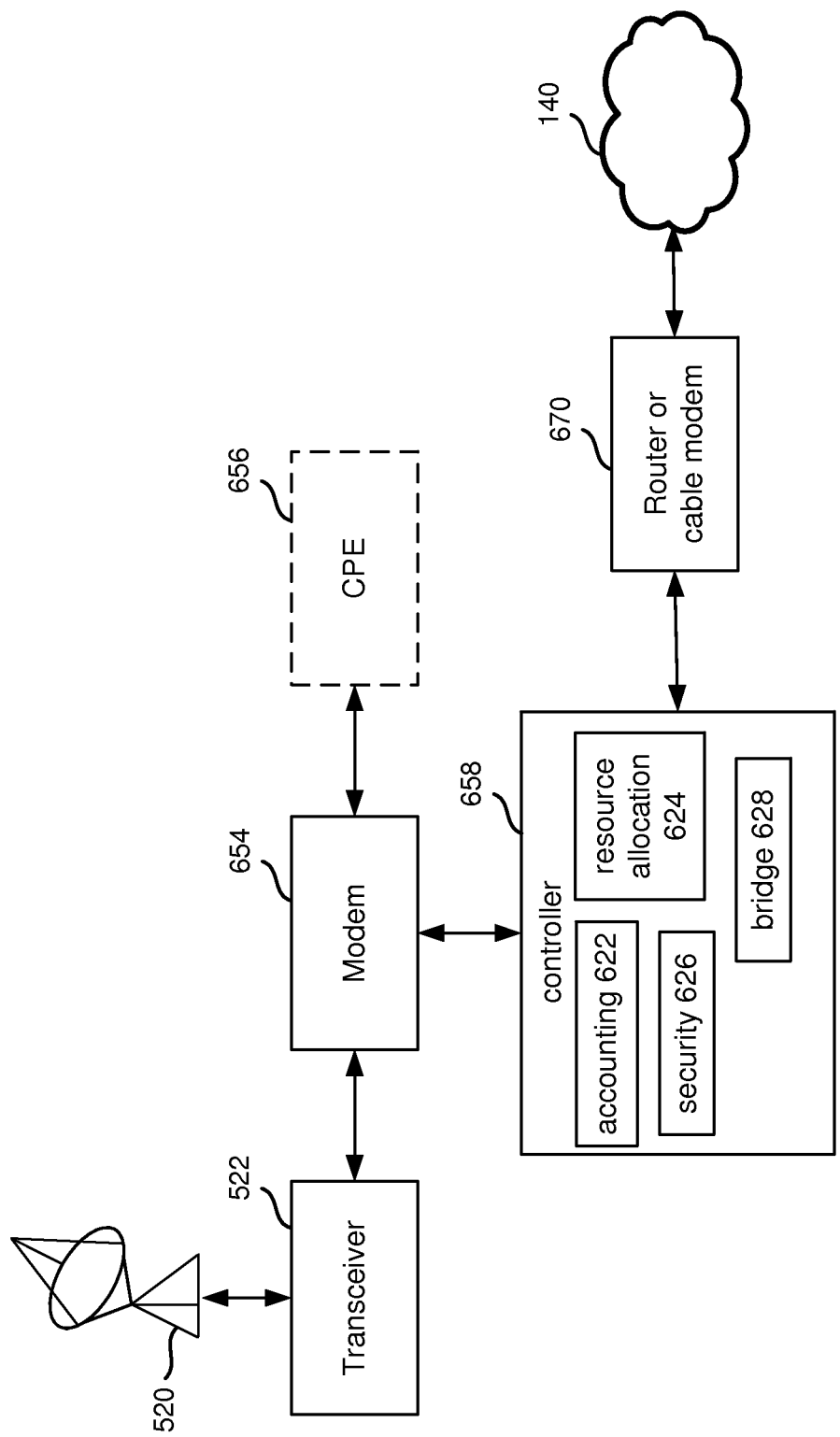
FIG. 10 is a block diagram depicting the components of one example of a super subscriber terminal.

FIG. 10 depicts the components of one example of the super subscriber terminal ST+ 620. Antenna 520 and transceiver 522 of the super subscriber terminal may be the same as a normal subscriber terminal. A different or enhanced modem 654 is used to provide additional services that a gateway may perform. In one embodiment, all the additional services are provided by modem 654, which is in communication with customer premises equipment 656. In other embodiments, modem 654 can be connected to a controller 658 which has a set of software modules for performing various functions typically associated with a gateway. For example, controller 658 includes accounting module 622, resource allocation module 624, security module 626 and bridge module 628. In one embodiment, modules 622-628 are implemented in software; however, in other embodiments they are implemented hardware or a combination. Controller 658 is connected to router or cable modem 670 which provides access to Internet or network 140. Accounting module 622 is used to determine how much access one or more users (e.g. 612/614) have utilized in order to provide appropriate billing. Resource allocation module 624 is used to allocate resources (e.g. time slots, power, etc.) to either the nominal or reverse roundtrip directions. Security module 626 will provide encryption and other security services. Bridge module 628 provides a bridge between modem 654 and a router or cable modem 670. Gateways 610 and 620 communicate with NCC 130, similar to Gateway 105 communicating with NCC 130.

FIG. 11 is a flowchart describing the operation of the systems of FIGS. 8 and 9. In step 700, the system utilizes satellite resources, including a first signal path (e.g. FIG. 5) and a second signal path (e.g. FIG. 6), in a first (nominal) direction for a set of gateways and subscriber terminals. In step 702, the system utilizes the satellite resources, including the first signal path and second signal path, in a second (reverse) roundtrip direction for the second set of gateways and subscriber terminals simultaneously with operation in the first roundtrip direction.

FIGS. 12 and 13 are flowcharts describing the performance of steps 700 and 702. The process of FIG. 12 is one example implementation of step 700. The process of FIG. 13 is one example implementation of step 702. In one embodiment, the process of FIG. 12 is performed concurrently with the process of FIG. 13.

In step 742 of FIG. 12, first forward data is received at the gateway (i.e. gateway 105). In one embodiment, the data is received from the Internet; however, in other embodiments other networks can be used to communicate with gateway 105. In step 744, the received first forward data is transmitted from gateway 105 to the satellite 100 via feeder beam 102. In step 746, that first forward data is routed on the satellite to an antenna for the service beam (e.g. service beam 106). In step 748, that first forward data is transmitted via the service beam from satellite 100 to subscriber terminals 107. In step 750, subscriber terminals 107 transmit first return data to satellite 100 via service beam 106. In step 752, that first return data is routed on the satellite to the appropriate antenna for the feeder beam for the gateway 105 to receive the data. That data is then transmitted from satellite 100 to gateway 105 via the feeder beam in step 754 for eventual transmission on the Internet.

In step 772 of FIG. 13, second forward data is received at a gateway from the Internet. For example, gateway 610/620 receives data from internet 140. That second forward data is transmitted from the gateway to the satellite such as from gateway 610 to satellite 100. In step 776, the second forward data is routed to the appropriate feeder beam (e.g. feeder beam 102). In step 778, the second forward data is transmitted from the satellite 100 to subscriber terminals (612 or 614) in the feeder beam 102. In step 780, second return data is transmitted from the appropriate subscriber terminal (612 or 614) to satellite 100 via feeder beam 102. In step 782, the second return date is routed on the satellite 100 to the appropriate service beam (e.g. service beam 106). In step 784, the second return data is transmitted to gateway 610 (or super subscriber terminal 620) via the service beam 106.

Note that step 746 of FIG. 12 is performed using the hardware of FIG. 5 and step 752 is performed using the hardware of FIG. 6. On the other hand, step 776 of FIG. 13 is performed using the hardware of FIG. 6 and step 782 is implemented using the hardware of FIG. 5. Similarly, the process of FIG. 5 is performed using the nominal roundtrip direction 639 while the process of FIG. 13 implements the reverse roundtrip direction 640.

Figure 14:
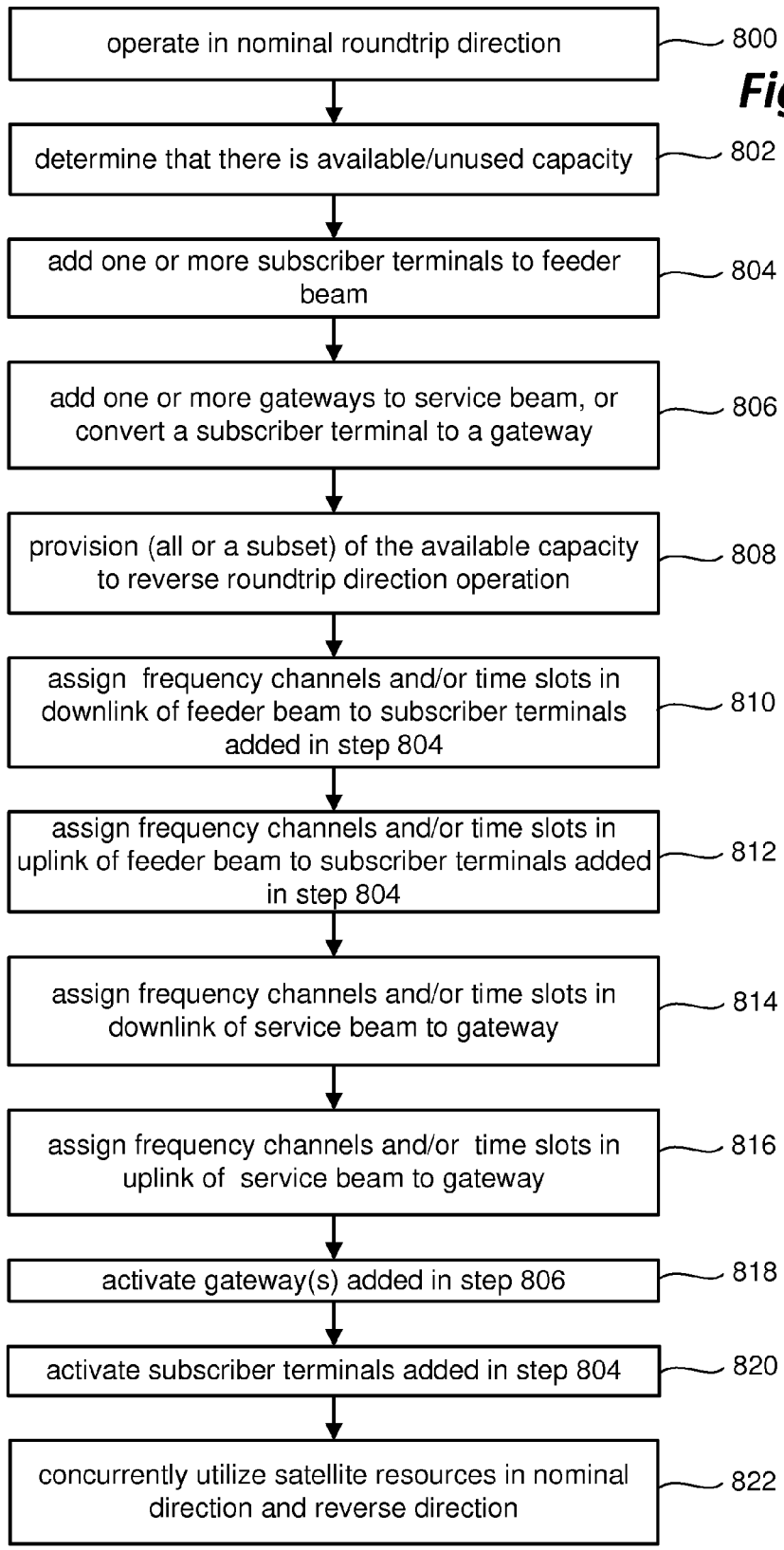
FIG. 14 is a flow chart describing one embodiment of a process for operating a satellite system.

FIG. 14 is a flowchart describing one embodiment of a process for initiating concurrent utilization of the nominal roundtrip direction 639 and reverse roundtrip direction 640. In step 800, the system operates only in the nominal roundtrip direction. That is, the system will operate as depicted in FIG. 1. In step 802, network control center 130 determine that there is available unused capacity associated with feeder beam 102 and service beam 106. In step 804, one or more subscriber terminals (e.g. subscriber terminals 612 and 614) are added or enabled to feeder beam 102. In step 806, one or more gateways (e.g. gateway 610 or a super subscriber terminal 620) are added or enabled to a service beam (e.g. service beam 106). In step 808, network control center 130 provision all or a subset of the available unused capacity to the reverse roundtrip direction operation. In step 810, network control center 130 assigns one or more frequency channels (e.g., colors or portions thereof) and/or time slots in the downlink of feeder beam to the subscriber terminals added at step 804. In step 812, network control center 130 assign frequency channels and/or time slots in the uplink of the feeder beam to the subscriber terminals added in step 804. In step 814, network control center 130 assigns frequency channels and/or time slots in the downlink of the service beam (e.g. service beam 106) for the added gateway (e.g., gateway 610). In step 816, network control center 130 assigns frequency channels and/or time slots in the uplink of the service beam (e.g. service beam 106) for the added gateway (e.g., gateway 610). In step 818, the new gateway (e.g., gateway 610 added in step 806) is activated. In step 820, the subscriber terminals added to the feeder beam in step 804 are activated. In step 822, the system is concurrently utilizing satellite resources in both the nominal roundtrip direction and reverse roundtrip direction, as described above, thus generating more revenues, satisfy more users, or reduce the number of unsatisfied users than the nominal-only configuration depicted in FIG. 1 would support. Since satellite (platform) 100 may not need any changes, adjustment on the gateway/user side can be done well after satellite launch, and dynamically according to market condition and user demand.

The process of FIG. 14 can be performed at the direction of the network control center 130. In one example implementation, the network control center determines that there is available unused capacity in the forward path for communicating from gateway 105 to the first set of subscriber terminals in region 108 and assigns at least a subset of the available unused capacity to the return path for communicating from the second set of subscriber terminals 612/614 in region 104 to the second gateway 610. Similarly, at least a subset of the capacity of the return path for communicating between the first set of subscriber terminals in region 108 and second gateway 105 is assigned by the network control center to the forward path between gateway 610 and the second set of subscriber terminals 612/614 in region 104.

Figure 15:
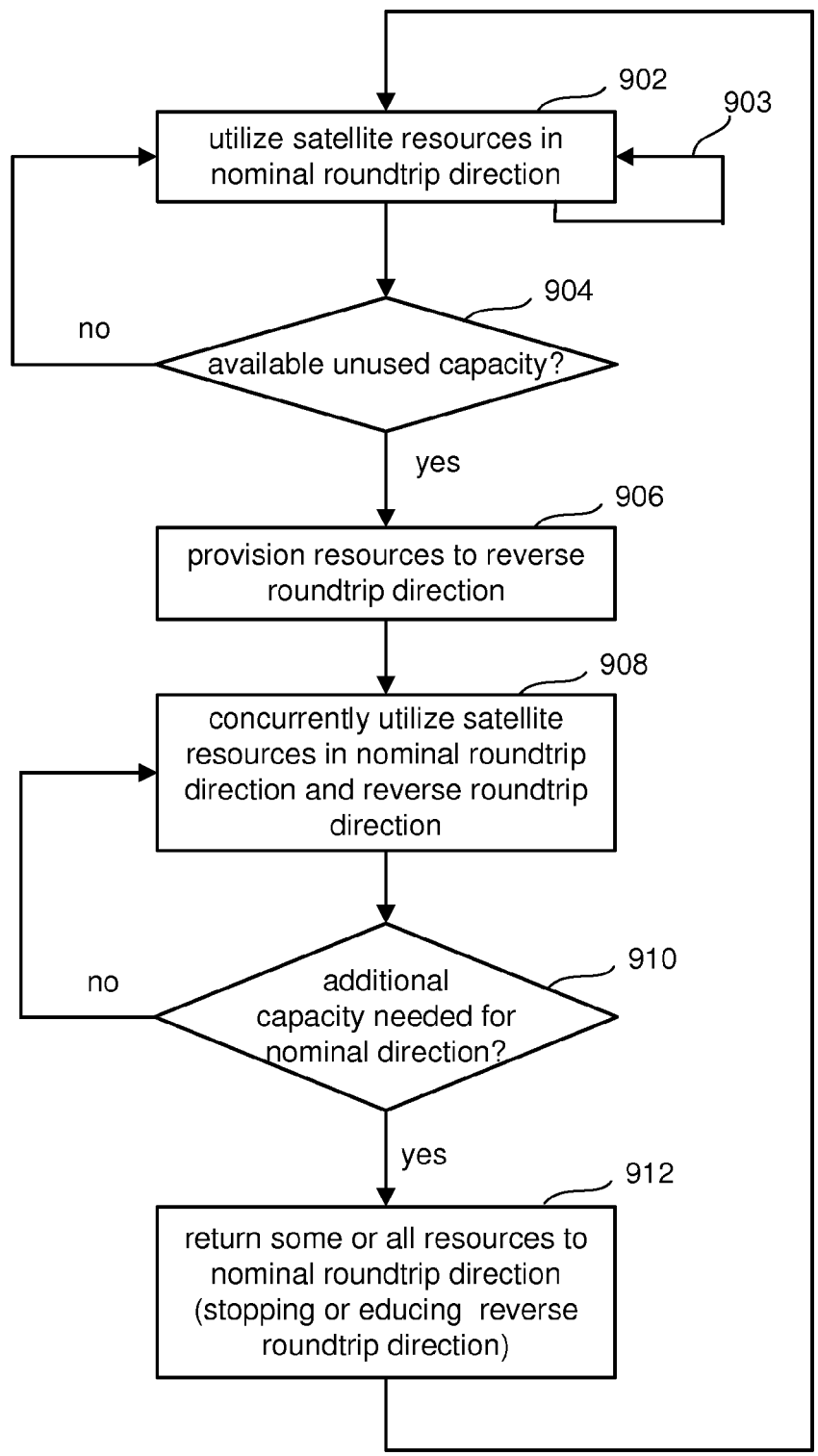
FIG. 15 is a flow chart describing one embodiment of a process for dynamically operating a satellite system.

In one embodiment, the provisioning, transferring and stopping use of resources between the nominal roundtrip direction and reverse roundtrip direction can be performed dynamically as capacity is needed by various customers of the communication system. Such an embodiment is described in the flowchart of FIG. 15. In step 902, the system will utilize satellite resources in the nominal roundtrip direction, as described above. If the network control center 130 determines that there is no available unused capacity (step 904), then the process will loop back step 902 and continue utilizing the satellite resources in the nominal roundtrip direction only. However, in step 904, if the network control center 130 determines that there is available unused capacity in the service beam and associated feeder beam, then in step 906 network control center 130 will provision resources to the reverse roundtrip direction, as described above. In one embodiment, even if the test for step 904 fails because all capacity is used by the nominal direction, some resources can be allocated to the reverse direction to optimize certain objective functions such as maximized revenue, maximized number of satisfied users, or minimized number of unsatisfied users. In step 908, the system will concurrently utilize the satellite resources in the nominal roundtrip direction and reverse roundtrip direction, as described above. If no additional capacity is needed in the nominal roundtrip direction (step 910), then the process will continue at step 908 to concurrently utilize the resources in both roundtrip directions. However, if additional capacity is needed in the nominal roundtrip direction, or the capacity in the reverse roundtrip direction is no longer needed (step 910), then at step 912 the system will return some or all of the resources from the reverse roundtrip direction to the nominal roundtrip direction, thereby stopping or reducing the utilization of the first and second signal paths for the reverse roundtrip direction. After step 912, the process will continue at step 902, utilizing the satellite resources in a nominal roundtrip direction only. Note that in some embodiments, step 902 is tested continuously (see arrow 903).

In many wireless systems, up and down links are specified to have the same bandwidth by the ITU. However, there usually is an unbalance, often very severe, between data rate needs between forward path and return path. The unbalance usually is not or cannot be fully matched by hardware design for the nominal direction. In the absence of the disclosure herein, valuable hardware and frequencies in the return path are often under-used even with the best circumstances. The reverse direction can take advantage of the difference between the designed capacity and the actual unbalance, because its own unbalance uses the opposite resources, for a complimentary fit.

Although the main example described above includes a satellite, the technology described herein can be used with other communication platforms, such as a UAV, balloon, airplane, helicopter, a dedicated terrestrial antenna, etc.

One embodiment includes a method of operating a communication platform (e.g., a satellite, a UAV, balloon, airplane, helicopter, a dedicated terrestrial antenna, etc.), comprising: utilizing communication platform resources, including a first signal path and a second signal path, in a first roundtrip direction for a first set of gateways and subscriber terminals; and utilizing the communication platform resources, including the first signal path and the second signal path, in a second roundtrip direction for a second set of gateways and subscriber terminals concurrently with utilizing the communication platform resources in the first roundtrip direction, the second direction is reverse of the first direction.

In an example implementation, the first roundtrip direction includes a first forward path and a first return path; the second roundtrip direction includes a second forward path and a second return path; the second forward path is in an opposite direction of the first forward path and in a same direction as the first return path. The communication platform resources include time slots for frequency channels, sub-bands within the frequency channels, and code space as practiced in CDMA schemes; and the utilizing the communication platform resources in the second roundtrip direction includes using time slots from the first forward path to communicate for the second return path and using time slots from the first return path to communicate for the second forward path. The process further includes determining that there is available unused capacity in the first forward path; and assigning at least a subset of the available unused capacity to the second return path, the assigning being performed prior to the utilizing the communication platform resources in the second roundtrip direction. The process further includes, after commencing the utilizing of the communication platform resources in the second roundtrip direction, determining that additional capacity is needed for the first roundtrip direction; and stopping the utilizing of the communication platform resources in the second roundtrip direction and transferring resources to the first roundtrip direction, in response to the determining that additional capacity is needed for the first roundtrip direction. In one example, the communication platform resources include frequency subchannels and the utilizing the communication platform resources in the second roundtrip direction includes using frequency subchannels from the first forward path to communicate for the second return path and using frequency subchannels from the first return path to communicate for the second forward path.

In some systems, a feeder beam is connected with several service beams. Therefore, in some embodiments the newly added subscriber terminals (for the reverse roundtrip direction) are served by a 3rd gateways in a 3rd region (another original service beam) for the forward path and the 2nd gateway (the new gateway) for the return path. This further exploits imbalance between designed capacity versus actual demand. For example, subscriber terminal 612 may be served by a new gateway added to spot beam 118 for the forward path and gateway 610 in the return path. One example implementation includes the first set of gateways and subscriber terminals includes a first gateway in a first region and a first set of subscriber terminals in a second region; the second set of gateways and subscriber terminals includes a second gateway in the second region, a second set of subscriber terminals in the first region, and a third gateway in a third region; the second set of subscriber terminals communicate with the third gateway, via the satellite, for a forward path; and the second set of subscriber terminals communicate with the second gateway, via the satellite, for a return path.

One embodiment of a satellite system comprises an antenna system configured to create a beam pattern that includes a first beam illuminating a first region and a second beam illuminating a second region, the antenna system is configured to communication with a first gateway in the first region via the first beam, the antenna system is configured to communication with a second gateway in the second region via the second beam, the antenna system is configured to communication with a first set of subscriber terminals in the second region via the second beam, the antenna system is configured to communication with a second set of subscriber terminals in the first region via the first beam; a first signal path comprising amplifiers, filters and frequency converters connected to the antenna system, the first signal path is configured to operate as a forward path for communicating from the first gateway to the first set of subscriber terminals, the first signal path is configured to operate as a return path for communicating from the second set of subscriber terminals to the second gateway; and a second signal path comprising amplifiers, filters and frequency converters connected to the antenna system, the second signal path is configured to operate as a forward path for communicating from the second gateway to the second set of subscriber terminals, the second signal path is configured to operate as a return path for communicating from the first set of subscriber terminals to the first gateway.

One embodiment of a satellite system, comprises: a first gateway in a first region; a second gateway in a second region; a first set of subscriber terminals in the second region; a second set of subscriber terminals in the first region; and a satellite configured to create a beam pattern that includes a first beam illuminating the first region and a second beam illuminating the second region, the satellite is configured to communicate with the first gateway and the second set of subscriber terminals via the first beam, the satellite is configured to communicate with the second gateway and the first set of subscriber terminals via the second beam, the satellite is configured to provide nominal forward path communication from the first gateway to the first set of subscriber terminals over a same first signal path as reverse return path communication from the second set of subscriber terminals to the second gateway.

One embodiment of a method of operating a satellite comprises utilizing a first signal path and a second signal path in a first roundtrip direction for a first set of gateways and subscriber terminals; provisioning a portion of a set of resources for the first signal path and the second signal path for communication between a second set of gateways and subscriber terminals; and utilizing the first signal path and the second signal path in a second roundtrip direction with the provisioned resources for the second set of gateways and subscriber terminals concurrently while utilizing the first signal path and the second signal path in first roundtrip direction for the first set of gateways and subscriber terminals. One example implementation further comprises transferring the set of resources for the first signal path and the second signal path to use with the first roundtrip direction and stopping the utilizing of the first signal path and the second signal path in the second roundtrip direction for the transferred resources. In some embodiment, the provisioning, transferring and stopping are performed dynamically.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A method of operating a communication platform, comprising:
utilizing communication platform resources, including a first signal path and a second signal path, in a first roundtrip direction for a first gateway and first subscriber terminals;
utilizing the communication platform resources, including the first signal path and the second signal path, in a second roundtrip direction for a second gateway and second subscriber terminals concurrently with utilizing the communication platform resources in the first roundtrip direction, the second direction is reverse of the first direction;
the first roundtrip direction includes a first forward path from the first gateway to the first subscriber terminals and a first return path from the first terminals to the first gateway;
the second roundtrip direction includes a second forward path from the second gateway to the second subscriber terminals and a second return path from the second subscriber terminals to the second gateway;
the first gateway connected to a network to provide network data to the first subscriber terminals over the first forward path;
the second gateway connected to the network to provide network data to the second subscriber terminals over the second forward path; and
the second forward path is in an opposite direction of the first forward path and in a same direction as the first return path.

2. The method of claim 1, wherein:
the communication platform resources include time slots for frequency channels; and
the utilizing the communication platform resources in the second roundtrip direction includes using time slots from the first forward path from the first gateway to the first subscriber terminals to communicate for the second return path from the second subscriber terminals to the second gateway and using time slots from the first return path from the first subscriber terminals to the first gateway to communicate for the second forward path from the second gateway to the second subscriber terminals.

3. The method of claim 1, further comprising:
determining that there is available unused capacity in the first forward path; and
assigning at least a subset of the available unused capacity to the second return path, the assigning being performed prior to the utilizing the communication platform resources in the second roundtrip direction.

4. The method of claim 3, further comprising:
after commencing the utilizing of the communication platform resources in the second roundtrip direction, determining that additional capacity is needed for the first roundtrip direction; and transferring at least a subset of the communication platform resources in the second roundtrip direction to the first roundtrip direction, in response to the determining that additional capacity is needed for the first roundtrip direction.

5. The method of claim 1, wherein:
the communication platform resources include frequency subchannels; and
the utilizing the communication platform resources in the second roundtrip direction includes using frequency subchannels from the first forward path to communicate for the second return path and using frequency subchannels from the first return path to communicate for the second forward path.

6. The method of claim 1, wherein:
the first signal path comprises amplifiers, filters and frequency converters, the first signal path is configured to operate as a forward path for the first set of gateways and subscriber terminals and to operate as a return path for the second set of gateways and subscriber terminals; and
the second signal path comprises amplifiers, filters and frequency converters, the second signal path is configured to operate as a return path for the first set of gateways and subscriber terminals and to operate as a forward path for the second set of gateways and subscriber terminals.

7. The method of claim 1, wherein:
the first gateway is in a first region and the first subscriber terminals are in a second region; and
the second gateway is in the second region and the second subscriber terminals are in the first region.

8. The method of claim 7, further comprising:
creating a beam pattern that includes a first beam illuminating the first region and a second beam illuminating the second region, the utilizing communication platform resources in the first roundtrip direction includes receiving first forward data from the first gateway via the first beam and transmitting the first forward data to the first set of subscriber terminals via the second beam as well as receiving first return data from the first set of subscriber terminals via the second beam and transmitting the first return data to the first gateway via the first beam, the utilizing communication platform resources in the second roundtrip direction includes receiving second forward data from the second gateway via the second beam and transmitting the second forward data to the second set of subscriber terminals via the first beam as well as receiving second return data from the second set of subscriber terminals via the first beam and transmitting the second return data to the second gateway via the second beam.

9. The method of claim 1, wherein:
the utilizing communication platform resources in the first roundtrip direction and the utilizing communication platform resources in the second roundtrip direction are performed by the communication platform; and
the communication platform is a satellite.

10. The method of claim 1, further comprising:
determining that available capacity exists for utilizing communication platform resources in the first roundtrip direction; and
provisioning at least a subset of the communication platform resources associated with the first roundtrip direction for the second roundtrip direction, wherein the determining, provisioning and activating are performed by a network control center.

11. The method of claim 1, wherein:
the first set of gateways and subscriber terminals includes a first gateway in a first region and a first set of subscriber terminals in a second region;
the second set of gateways and subscriber terminals includes a second gateway in the second region, a second set of subscriber terminals in the first region, and a third gateway in a third region;
the second set of subscriber terminals communicate with the third gateway, via the communication platform, for a forward path; and
the second set of subscriber terminals communicate with the second gateway, via the communication platform, for a return path.

12. A satellite system, comprising:
an antenna system configured to create a beam pattern that includes a first beam illuminating a first region and a second beam illuminating a second region, the antenna system is configured to communicate with a first gateway in the first region via the first beam, the antenna system is configured to communicate with a second gateway in the second region via the second beam, the antenna system is configured to communicate with a first set of subscriber terminals in the second region via the second beam, the antenna system is configured to communicate with a second set of subscriber terminals in the first region via the first beam;
a first signal path comprising amplifiers, filters and frequency converters connected to the antenna system, the first signal path is configured to operate as a first forward path for communicating from the first gateway to the first set of subscriber terminals, the first signal path is configured to operate as a second return path for communicating from the second set of subscriber terminals to the second gateway; and
a second signal path comprising amplifiers, filters and frequency converters connected to the antenna system, the second signal path is configured to operate as a second forward path for communicating from the second gateway to the second set of subscriber terminals, the second signal path is configured to operate as a first return path for communicating from the first set of subscriber terminals to the first gateway;
the first gateway connected to a network to provide network data to the first subscriber terminals over the first forward path;
the second gateway connected to the network to provide network data to the second subscriber terminals over the second forward path; and
the second forward path is in an opposite direction of the first forward path and in a same direction as the first return path.

13. The satellite system of claim 12, wherein:
the first signal path and the second signal path are operated in a first roundtrip direction for the first gateway and the first set of subscriber terminals; and
the first signal path and the second signal path are operated in a second roundtrip direction for the second gateway and the second set of subscriber terminals, the second roundtrip direction is reverse of the first roundtrip direction.

14. The satellite system of claim 12, wherein:
data from the first gateway is received at the antenna system in a first frequency channel in a first set of time slots; and
data from the second set of subscriber terminals is received at the antenna system in the first frequency channel in a second set of time slots that are different than and interleaved with the first set of time slots.

15. The satellite system of claim 12, further comprising:
a network control center processing system that determines that there is available unused capacity in the forward path for communicating from the first gateway to the first set of subscriber terminals and assigns at least a subset of the available unused capacity to the return path for communicating from the second set of subscriber terminals to the second gateway.

16. The satellite system of claim 15, wherein:
after assigning at least a subset of the available unused capacity to the return path for communicating from the second set of subscriber terminals to the second gateway, the network control center processing system determines that there is a need for more capacity in the forward path for communicating from the first gateway to the first set of subscriber terminals and returns at least a subset of the assigned capacity to the forward path for communicating from the first gateway.

17. A satellite system, comprising:
a first gateway in a first region;
a second gateway in a second region;
a first set of subscriber terminals in the second region;
a second set of subscriber terminals in the first region;
a satellite configured to create a beam pattern that includes a first beam illuminating the first region and a second beam illuminating the second region, the satellite is configured to communicate with the first gateway and the second set of subscriber terminals via the first beam, the satellite is configured to communicate with the second gateway and the first set of subscriber terminals via the second beam, the satellite is configured to provide communication in a first roundtrip direction and concurrently in a second roundtrip direction;
the first roundtrip direction includes a first forward path from the first gateway to the first subscriber terminals and a first return path from the first terminals to the first gateway;
the second roundtrip direction includes a second forward path from the second gateway to the second subscriber terminals and a second return path from the second subscriber terminals to the second gateway;
the first gateway connected to a network to provide network data to the first subscriber terminals over the first forward path;
the second gateway connected to the network to provide network data to the second subscriber terminals over the second forward path; and
the second forward path is in an opposite direction of the first forward path and in a same direction as the first return path.

18. The satellite system of claim 17, wherein:
the satellite is configured to provide nominal return path communication from the first set of subscriber terminals to the first gateway over a same second signal path as reverse forward path communication from the second gateway to the second set of subscriber terminals.

19. The satellite system of claim 18, wherein:
the first signal path comprises amplifiers, filters and frequency converters; and
the second signal path comprises amplifiers, filters and frequency converters.

20. The satellite system of claim 17, wherein:
the first gateway transmits data to the satellite in the first beam using a first frequency range and a first set of time slots; and
the second set of subscriber terminals transmit data to the satellite in the first beam using the first frequency range and a second set of time slots, the second set of time slots are different than and interleaved with the first set of time slots.

21. A method of operating a communication platform, comprising:
utilizing a first signal path and a second signal path in a first roundtrip direction for a first gateway and first subscriber terminals;
provisioning a portion of a set of resources for the first signal path and the second signal path for communication between a second gateway and second subscriber terminals;
utilizing the first signal path and the second signal path in a second roundtrip direction with the provisioned resources for the second gateway and second subscriber terminals concurrently while utilizing the first signal path and the second signal path in the first roundtrip direction for the first gateway and first subscriber terminals;
the first roundtrip direction includes a first forward path from the first gateway to the first subscriber terminals and a first return path from the first terminals to the first gateway;
the second roundtrip direction includes a second forward path from the second gateway to the second subscriber terminals and a second return path from the second subscriber terminals to the second gateway;
the first gateway connected to a network to provide network data to the first subscriber terminals over the first forward path;
the second gateway connected to the network to provide network data to the second subscriber terminals over the second forward path; and
the second forward path is in an opposite direction of the first forward path and in a same direction as the first return path.

22. The method of claim 21, further comprising:
transferring at least a portion of the set of resources for the first signal path and the second signal path to use with the first roundtrip direction; and
stopping the utilizing of the first signal path and the second signal path in the second roundtrip direction for the transferred resources.

23. The method of claim 22, wherein:
the provisioning, transferring and stopping are performed dynamically.

* * * * *